United States Patent
Itoo et al.

(10) Patent No.: US 9,499,036 B2
(45) Date of Patent: Nov. 22, 2016

(54) UTILITY VEHICLE

(71) Applicant: KAWASAKI JUKOGYO KABUSHIKI KAISHA, Hyogo (JP)

(72) Inventors: Seiji Itoo, Akashi (JP); Shinichi Tanaka, Kakogawa (JP); Ayumi Hamada, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,695

(22) Filed: Dec. 30, 2014

(65) Prior Publication Data
US 2016/0185202 A1    Jun. 30, 2016

(51) Int. Cl.
| | | |
|---|---|---|
| *B60K 13/02* | (2006.01) | |
| *B60K 5/00* | (2006.01) | |
| *B62D 33/02* | (2006.01) | |

(52) U.S. Cl.
CPC ............... *B60K 5/00* (2013.01); *B60K 13/02* (2013.01); *B62D 33/02* (2013.01); *B60K 2005/003* (2013.01)

(58) Field of Classification Search
CPC ....... B60R 16/04; Y02E 60/12; B62D 33/02; B60K 5/00; B60K 13/02
See application file for complete search history.

(56) References Cited

U.S. PATENT DOCUMENTS

| | | | | |
|---|---|---|---|---|
| 6,732,825 B2* | 5/2004 | Takeda | ............... | B62D 21/186 180/312 |
| 7,647,788 B2* | 1/2010 | Okuda | ............... | H01M 10/486 429/62 |
| 2009/0121518 A1* | 5/2009 | Leonard | ............... | B62D 61/10 296/183.1 |
| 2013/0230754 A1* | 9/2013 | Jeong | ............... | H01M 10/5004 429/83 |

FOREIGN PATENT DOCUMENTS

JP    2002-70668    3/2002

* cited by examiner

*Primary Examiner* — John Walters
*Assistant Examiner* — James Triggs
(74) *Attorney, Agent, or Firm* — Wenderoth, Lind & Ponack, L.L.P.

(57) ABSTRACT

A utility vehicle including a chassis, a seat provided on the chassis, a cargo bed provided behind the seat, an engine provided on the chassis, and a storage box provided below the cargo bed for storing an air cleaner of the engine, a battery, and the like. The storage box stores the air cleaner, the battery, and the like, and includes a box body having an opening provided in a top surface facing the cargo bed, and a top cover covering the opening.

6 Claims, 8 Drawing Sheets

UTILITY VEHICLE

BACKGROUND OF THE INVENTION

1. Field of the Invention

The present invention relates to a utility vehicle, and particularly to a storage box storing engine equipment such as an air cleaner of the engine, an air intake duct of the engine, and a battery.

2. Description of the Prior Art

An exemplary storage box in a conventional utility vehicle includes a box body having a substantially rectangular parallelepiped shape and storing equipment and a lid configured to open and close an opening provided at a side surface of the box body, and an opening provided at the top surface of the box body is covered with a bottom plate of a cargo bed or a seat of the utility vehicle. A sealing member is provided between the bottom plate and the opening at the top surface of the box body, so that water, dust, and the like do not enter the storage box from outside. Especially in order to prevent an engine from sucking water, dust, and the like, the storage box of the utility vehicle accommodates an air cleaner of an engine and air in the storage box is imported through an air inlet of the air cleaner. The storage box having a high sealing property also stores other equipment necessary to be protected from water, dust, and the like, such as a battery, electrical equipment, or an air import portion of a cooling duct of a transmission.

Though not a utility vehicle, in an intake structure of an air cleaner in a hydraulic excavator according to a conventional art disclosed in JP Laid-open Publication No. 2002-70668, for example, a storage box sealed by a sealing member accommodates the air cleaner of an engine and air is supplied from outside the storage box through an air intake duct to the air cleaner.

The sealing member provided between the opening and the bottom plate of the cargo bed or the seat of the utility vehicle requires a high material cost. The opening provided at the top surface or the side surface of the box body in the conventional utility vehicle needs to have at least a constant width because equipment in the storage box is checked or maintained through the opening. A clearance between the bottom plate and the opening cannot be decreased because there is no design flexibility with restriction by the position or the shape of the bottom plate of the cargo bed or the seat. The clearance thus needs to be filled with a large amount of the sealing member. The sealing member then fails to be decreased in amount of use, and the material cost is not decreased. Use of such a large amount of the sealing member leads to an unstable sealing property.

SUMMARY OF THE INVENTION

The present invention has been made in view of the problems mentioned above, and an object thereof is to provide a utility vehicle that enables reduction in material cost by reduction in amount of a sealing member for a storage box storing engine equipment, as well as enables stabilization of the sealing property.

In order to achieve the object mentioned above, the present invention provides a utility vehicle including: a chassis; one or a plurality of seat row(s) provided on the chassis; a cargo bed provided behind the seat row(s); an engine provided on the chassis; and a storage box provided below the seat row(s) or the cargo bed and storing equipment of the engine; wherein the storage box has a box body storing the equipment and having an opening in a top surface facing the seat row(s) or the cargo bed, and a top cover covering the opening.

The storage box according to the present invention has the top cover covering the opening. Design flexibility can be thus enhanced with no restriction by the position or the shape of a bottom plate of the cargo bed or the seat. As compared to a case where the opening is covered with the bottom plate of the cargo bed or the seat, a clearance between the opening and the top cover can be decreased and the sealing member used for filling the clearance is decreased in amount. This leads to reduction in material cost and stabilization of the sealing property.

The present invention can preferably adopt any of the following configurations in addition to the configuration described above.

(a) The top cover has an intake port that is located at a top of the storage box and supplies the storage box with air.

In the configuration (a), the top cover is provided with the intake port. Air is thus supplied into the storage box through the intake port. As compared to a case where air is supplied into the storage box from the bottom of the storage box, water, dust, and the like blown upward from the ground surface or the like are prevented from entering the storage box.

(b) The intake port is opened outward in a vehicle width direction.

In the configuration (b), the intake port is opened outward in the vehicle width direction. Air is thus imported from outside in the vehicle width direction to the storage box through the intake port. Water, dust, and the like blown upward from the ground surface or the like are likely to accumulate inside rather than outside in the vehicle width direction of the storage box. As compared to a case where air is imported from inside in the vehicle width direction of the storage box, water, dust, and the like are more reliably prevented from entering the storage box.

(c) The intake port is provided with a filter member.

In the configuration (c), the intake port is provided with the filter member. Air is thus imported to the storage box through the filter member of the intake port. As compared to a case where air is imported directly from the intake port without through the filter member, water, dust, and the like are more reliably prevented from entering the storage box.

(d) The top cover has a wall portion projecting upward from a top surface of the top cover to surround the intake port.

In the configuration (d), the wall portion projects upward from the top surface of the top cover so as to surround the intake port. The wall portion prevents water, dust, and the like from entering a region on the top surface of the top cover, so as to further decrease water, dust, and the like entering the storage box from the region on the top surface of the top cover through the intake port.

(e) The intake port is opened toward the wall portion.

In the configuration (e), the intake port is opened toward the wall portion. The wall portion prevents water, dust, and the like from directly entering the intake port, so as to more effectively decrease water, dust, and the like entering the storage box through the intake port.

BRIEF DESCRIPTION OF THE DRAWINGS

The above and other objects, features, and advantages of the present invention will become more apparent from the following description taken in connection with the accompanying drawings, in which.

DETAILED DESCRIPTION OF THE PREFERRED EMBODIMENTS

FIGS. 1 to 8 each show a utility vehicle according to the present invention. A preferred embodiment of the present invention will now be described with reference to these figures. For convenience of explanation, an advancing direction of the utility vehicle is explained as the "front" of the utility vehicle and the respective components thereof, and the left-right direction as viewed from the driver or the passenger of the vehicle is explained as the "left-right direction" of the vehicle and the respective components thereof.

Figure 1:
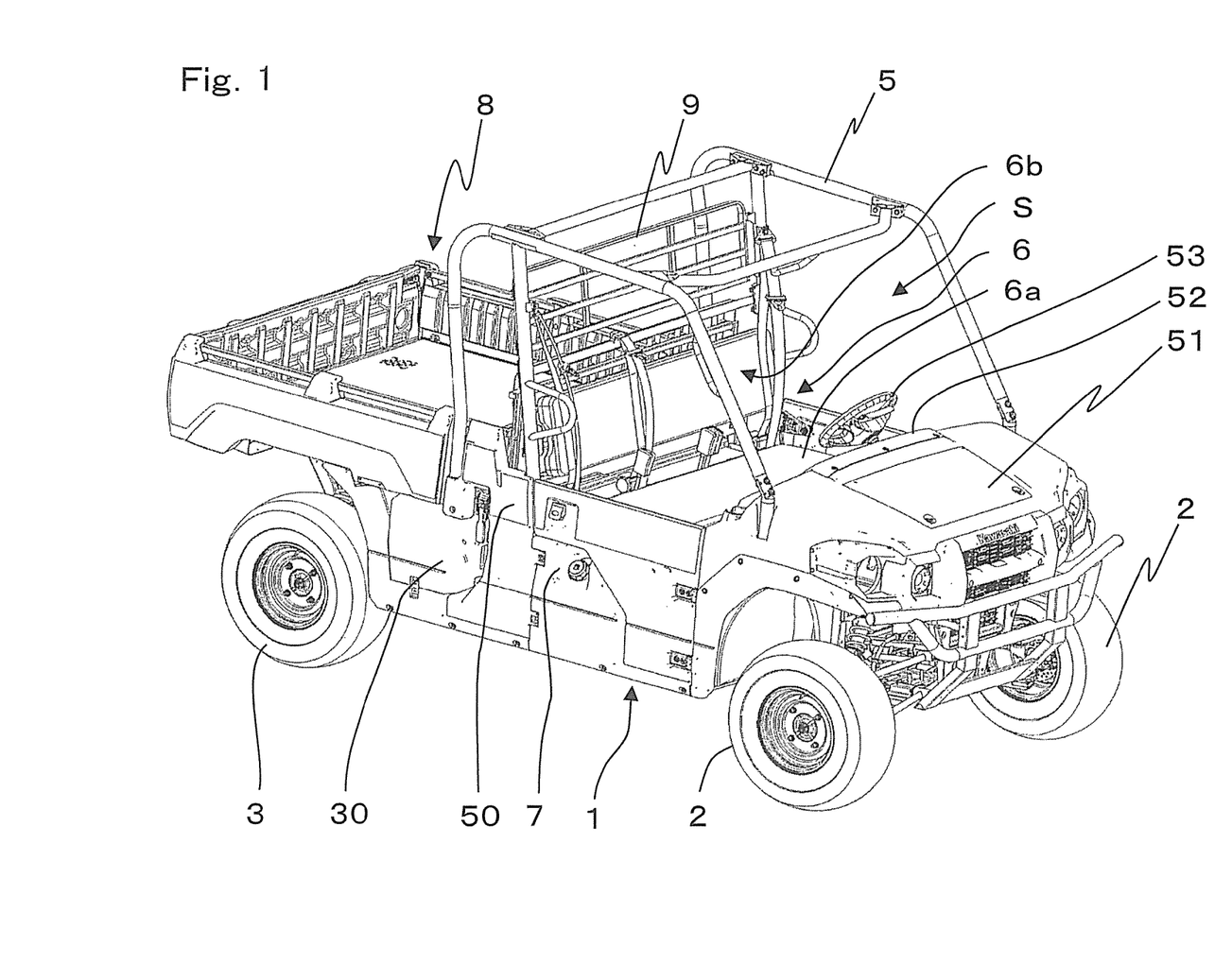
FIG. 1 is a perspective view viewed from diagonally front right, of a utility vehicle according to the present invention.

FIG. 1 is a perspective view showing the utility vehicle according to the present invention, viewed from the diagonally right front. The utility vehicle is used mainly for running in off-road circumstances like a grass field, a gravel field, and a sand field as well as an unpaved mountain path, an unpaved path through woods, a mud path, and a rocky field.

As shown in FIG. 1, the utility vehicle includes a chassis 1 that has a front portion provided with a pair of right and left front wheels 2 and a rear portion provided with a pair of right and left rear wheels 3. The chassis 1 is provided, at the lateral ends, with side covers 50 covering lateral portions of the chassis 1. A boarding space S is provided between the front wheels 2 and the rear wheels 3 and is surrounded with a R. O. P. S. 5. The R. O. P. S. is an abbreviation for a rollover protective structure. The boarding space S accommodates a bench type seat 6. The seat 6 configures a single seat row. A fuel tank 7 is provided below the seat 6. A cargo bed 8 is provided behind the seat 6. A screen 9 is provided between the boarding space S and the cargo bed 8. A bonnet 51 is provided in front of the boarding space S. The bonnet 51 is provided, at the upper rear end, with a dashboard 52. The dashboard 52 is provided with a steering wheel 53 and a shift lever (not shown) in an operable range for a driver seated in a driver's region 6a of the seat 6.

The cargo bed 8 extends backward beyond the rear wheels 3 and substantially horizontally from the vicinity of a backrest 6b of the seat 6. A storage box 30 is provided on the right and below the cargo bed 8 as well as ahead of the rear wheels 3.

Figure 2:
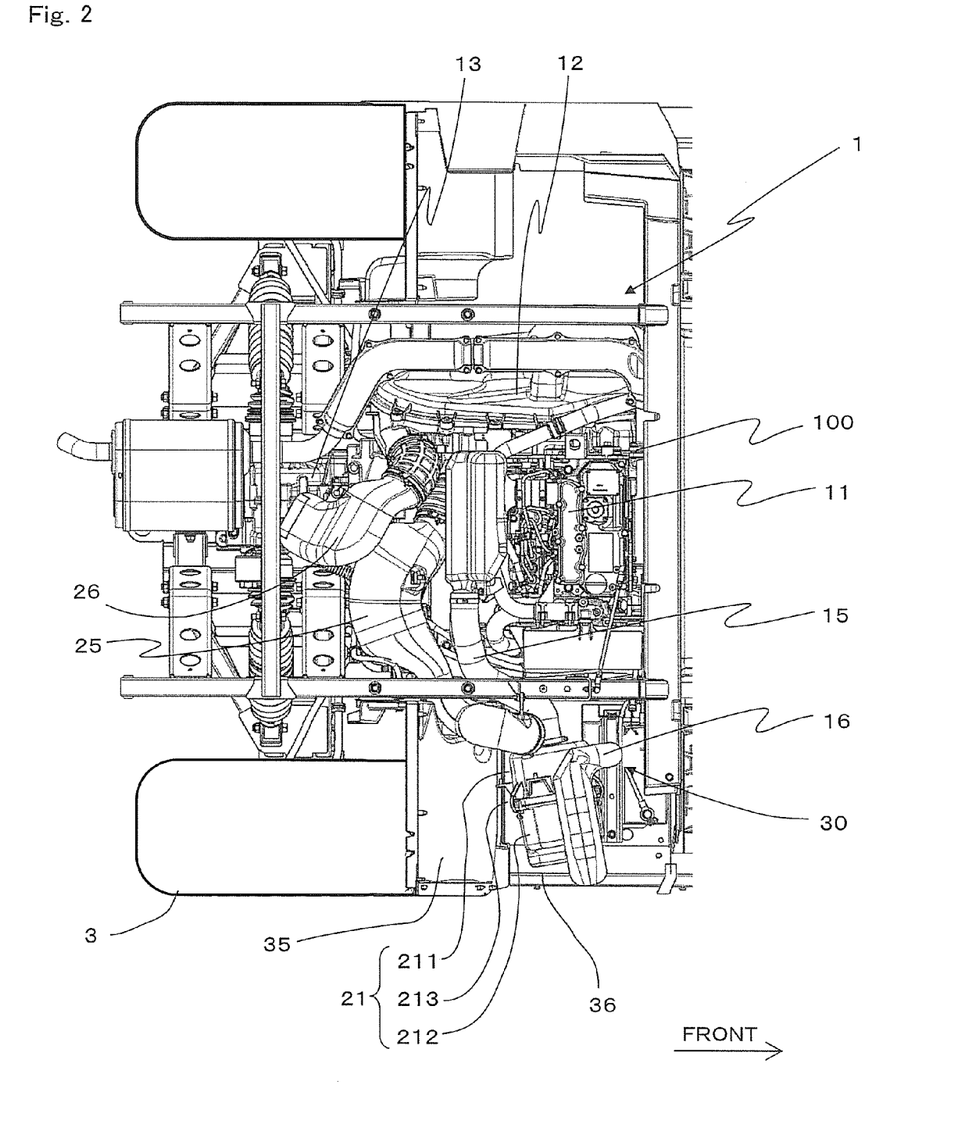
FIG. 2 is a plan view of an engine and engine peripheral structures of the utility vehicle.
Figure 3:
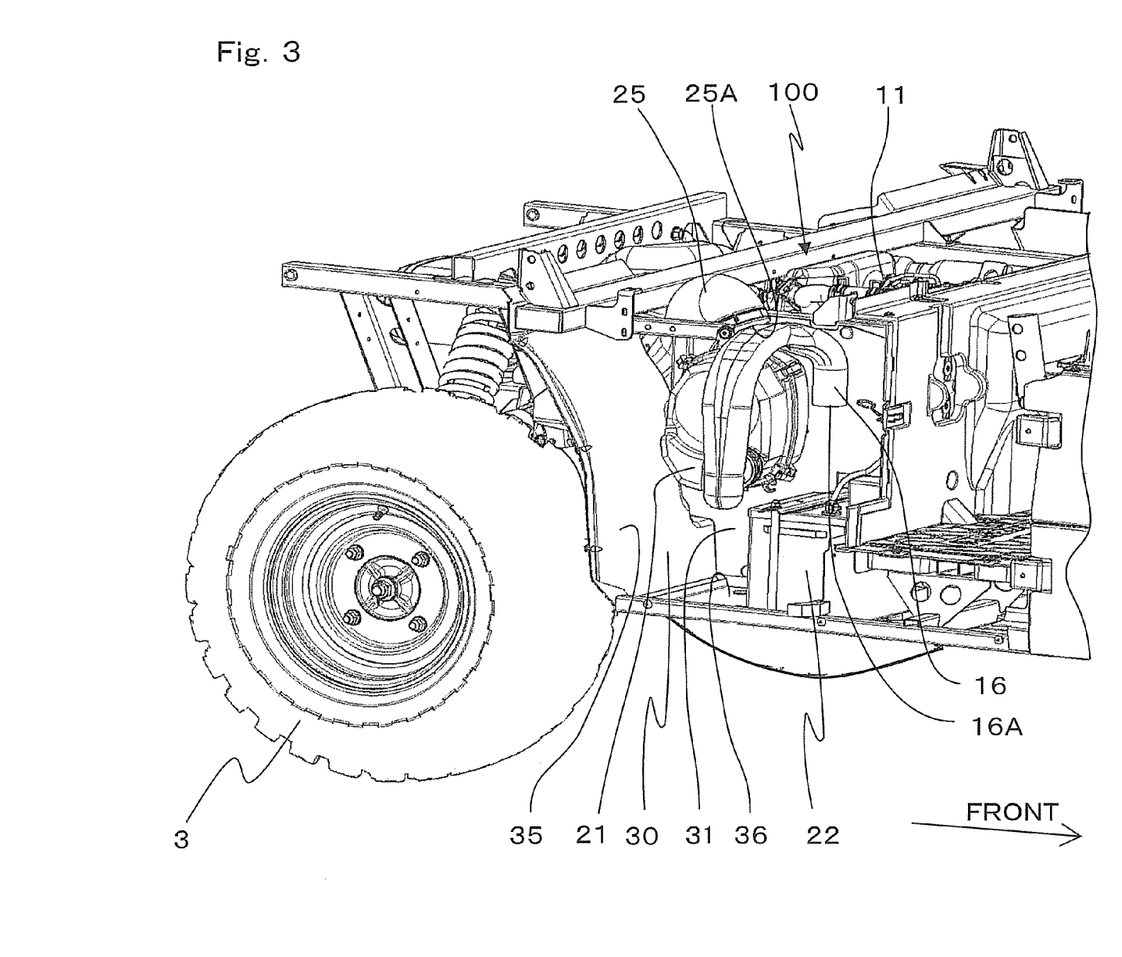
FIG. 3 is a perspective view viewed from upper right, of the engine and the engine peripheral structures.

FIG. 2 is a plan view of an engine and engine peripheral structures. FIG. 3 is a perspective view viewed from upper right, of the engine and the engine peripheral structures.

FIG. 3 shows a state where a lid 33 and a side surface cover 32 of the storage box 30 are removed.

As shown in FIGS. 2 and 3, an engine room 100 is provided on the left next to the storage box 30. The engine room 100 and the storage box 30 are divided from each other by a partition member 31. The engine room 100 accommodates a travel driving engine 11, a V-belt continuously variable transmission 12, a gear type transmission 13, an air intake duct 15 for combustion air of the engine 11, a cooling duct 25 for coolant air of the V-belt continuously variable transmission 12, an exhaust duct 26 for coolant air, and the like. The engine 11 is attached to the chassis 1. The V-belt continuously variable transmission 12 is connected to the left end of the engine 11. The engine 11 has an output shaft coupled to a rear vehicle shaft (not shown) by way of the V-belt continuously variable transmission 12 and the gear type transmission 13 so as to transmit motive power. The rear wheels 3 are coupled respectively to the ends of the rear vehicle shaft.

The storage box 30 has a storage space surrounded with and airtightly sealed by the lid and the side surface cover (not shown), as well as a rear surface cover 35, a bottom plate 36, and the partition member 31. This storage space accommodates equipment of the engine 11 such as an air cleaner 21, a battery 22, the air intake duct 15 of the engine 11, as well as part of an air import duct 16 of the air cleaner 21 and the cooling duct 25 of the V-belt continuously variable transmission 12. The rear surface cover 35 is a plate member curved to surround part of the rear wheels 3 along peripheral surfaces and end surfaces of the rear wheels 3. The rear surface cover 35 serves as a fender preventing entry of dust from the rear wheels 3.

The air cleaner 21 has a substantially rectangular parallelepiped shape. The air cleaner 21 is located between the battery 22 and the rear surface cover 35 of the storage box 30. The air cleaner 21 includes a main case 211, an air import case 212, a plurality of clamps 213, and a filter (not shown). The air import case 212 is detachably attached to the main case 211 by the plurality of clamps 213. The filter is accommodated in the main case 211.

The air intake duct 15 of the engine 11 has one end connected to an intake manifold of the engine 11 and the other end connected to the main case 211 of the air cleaner 21. The air intake duct 15 is part of an intake system of the engine 11.

The air import duct 16 of the air cleaner 21 has one end connected to the center of the right side surface of the air import case 212 of the air cleaner 21. The air import duct 16 has the other end, namely, an air inlet 16A, located in the storage box 30 and opened downward. The air import duct 16 is part of the intake system of the engine 11.

The cooling duct 25 of the V-belt continuously variable transmission 12 has one end connected to the V-belt continuously variable transmission 12. The cooling duct 25 has the other end, namely, an air inlet 25A, located in the storage box 30 and opened downward. The cooling duct 25 is part of an intake system of the V-belt continuously variable transmission 12.

As described above, the storage box 30, in other words, the storage space, collectively accommodates the air inlet 16A of the air import duct 16 of the air cleaner 21 and the air inlet 25A of the cooling duct 25 of the V-belt continuously variable transmission 12. Clean air in the storage space is thus imported to the air cleaner 21 and the V-belt continuously variable transmission 12.

The battery 22 has a substantially rectangular parallelepiped shape. The battery 22 is attached to the bottom plate 36 of the storage box 30.

Figure 4:
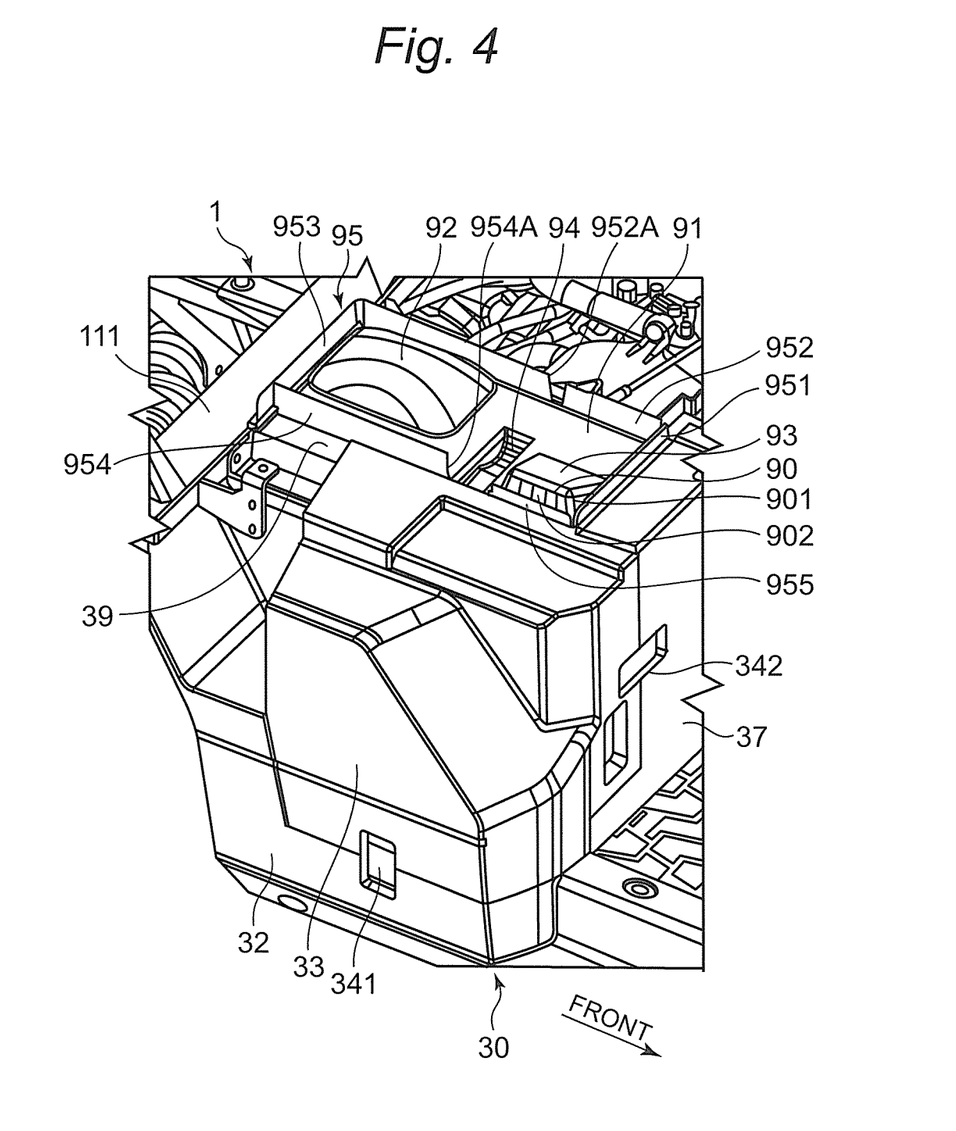
FIG. 4 is a perspective view viewed from diagonally front right, of a storage box of the utility vehicle.

FIG. 4 is a perspective view viewed from diagonally upper right, of the storage box 30. FIG. 4 does not depict the cargo bed 8.

As shown in FIG. 4, the storage box 30 includes the right side surface cover 32, a front surface cover 37, the lid 33, a top cover 39, and attachment parts 341 and 342.

As shown in FIGS. 3 and 4, a box body is formed by the partition member 31, the right side surface cover 32, the front surface cover 37, the rear surface cover 35, and the bottom plate 36.

The lid 33 is detachably attached to the right side surface cover 32 and the front surface cover 37 by the attachment parts 341 and 342, respectively.

The top cover 39 is a plate member. The top cover 39 is located over the top surface of the storage box 30 so as to face the cargo bed (not shown) from below, and covers part of an opening to be described later, of the box body. The top cover 39 is fixed to a cross pipe 111 and the like of a main frame of the chassis 1 by a fastener. The top cover 39 has a flat portion 91, first and second convex portions 92 and 93 as well as a wall portion (fence portion) 95 projecting upward from the flat portion 91, and a recess portion 94 recessed downward from the flat portion 91.

The flat portion 91 has a substantially rectangular shape. The flat portion 91 forms part of the top surface of the storage box 30.

The first convex portion 92 projects in an arch shape or an arcuate shape from the flat portion 91, and is located in a rear portion of the flat portion 91. The second convex portion 93 has a top surface slanted from the flat portion 91, has a triangular shape when viewed from front, and is located in a front portion of the flat portion 91 and outside in the vehicle width direction. The second convex portion 93 has an outer surface in the vehicle width direction, provided with an intake port 90 as an opening in a substantially rectangular shape. The intake port 90 is opened outward in the vehicle width direction. Air is supplied into the storage box 30 through the intake port 90. The intake port 90 is provided with a lattice 901 and a filter member 902. The lattice 901 prevents relatively large foreign matters and the like from entering the storage box 30 through the intake port 90.

The recess portion 94 is located between the first convex portion 92 and the second convex portion 93 and outside in the vehicle width direction of the flat portion 91.

The wall portion 95 is a plate member, stands vertically from the peripheral edges of the flat portion 91 and extends along the four sides of the flat portion 91. The wall portion 95 includes a front wall 951 located at the front end of the flat portion 91, a left wall 952 located inside (on the left) in the vehicle width direction of the flat portion 91, a rear wall 953 located at the rear end of the flat portion 91, and right walls 954 and 955 located outside (on the right) in the vehicle width direction of the flat portion 91. The right wall 954 and the right wall 955 are located on an identical plane. The right wall 954 is located behind the right wall 955 with a gap therebetween. The right wall 955 is lower than the right wall 954 and the left wall 952. The wall portion 95 substantially surrounds the intake port 90, the first and second convex portions 92 and 93, and the recess portion 94. The intake port 90 is opened toward the right wall 955 of the wall portion 95.

The left wall 952 of the wall portion 95 is provided, at the center in the front-back direction, with a cutout 952A. The cutout 952A is located on the left of the recess portion 94.

A cutout 954A is provided between the right wall 954 and the right wall 955 of the wall portion 95. The cutout 954A is located on the right of the recess portion 94.

Figure 5:
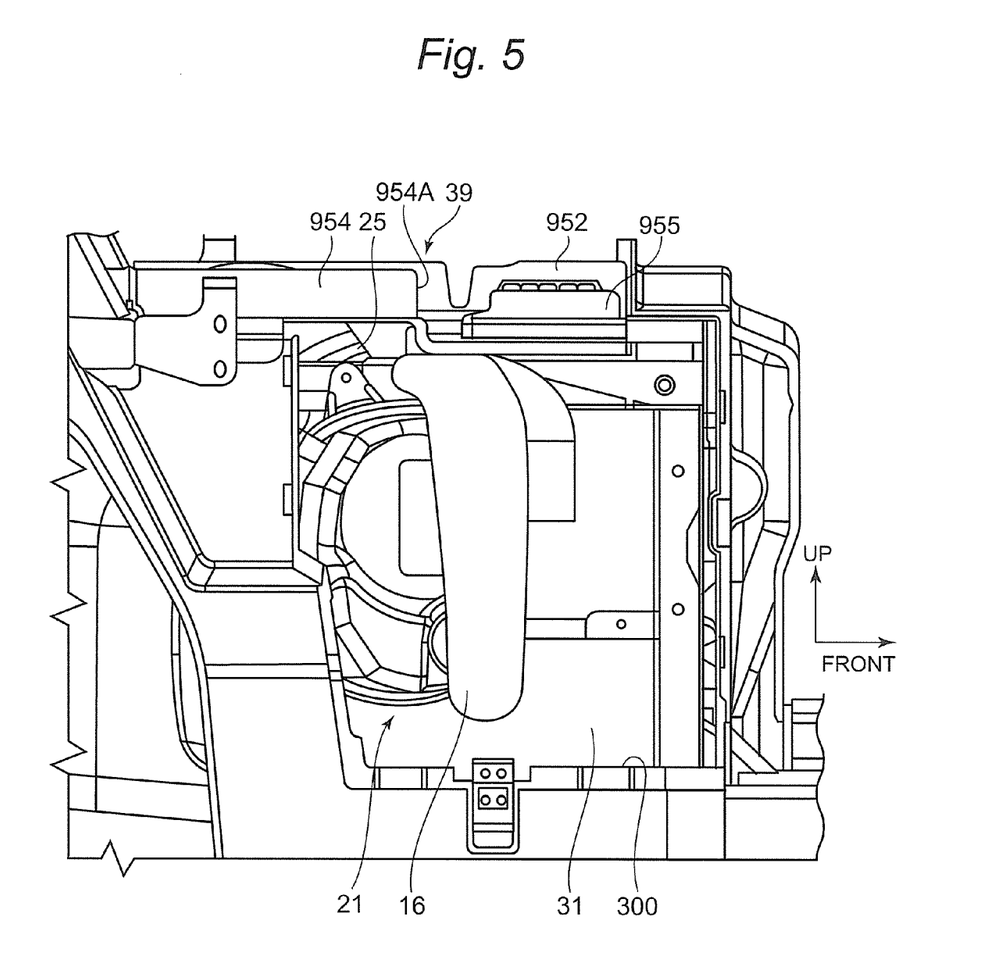
FIG. 5 is a view viewed from outside in the vehicle width direction, of the storage box in a state where a lid of the storage box is removed.
Figure 6:
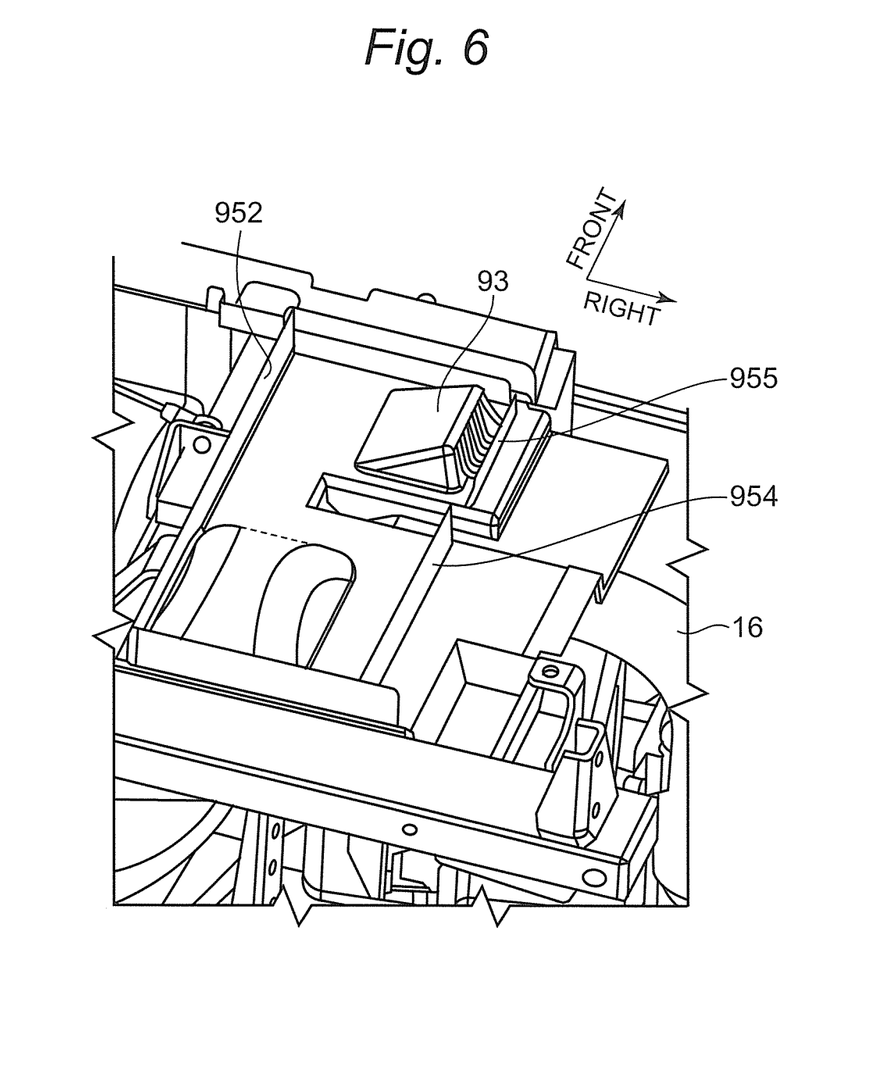
FIG. 6 is a perspective view viewed from upper right, of the storage box in the state where the lid of the storage box is removed.

FIG. 5 is a view viewed from outside in the vehicle width direction, of the storage box 30 in a state where the lid 33 is removed. FIG. 6 is a perspective view viewed from upper right, of the storage box 30 in the state where the lid 33 is removed.

As shown in FIGS. 5 and 6, when the lid 33 is removed, exposed from an opening 300 of the box body are the air cleaner 21, the air import duct 16 of the air cleaner 21, the cooling duct 25 of the V-belt continuously variable transmission in the storage box 30, and the partition member 31 of the storage box 30. The opening 300 extends partially over the top surface, the front surface, and the outer side surface (right side surface) in the vehicle width direction of the storage box 30.

Figure 7:
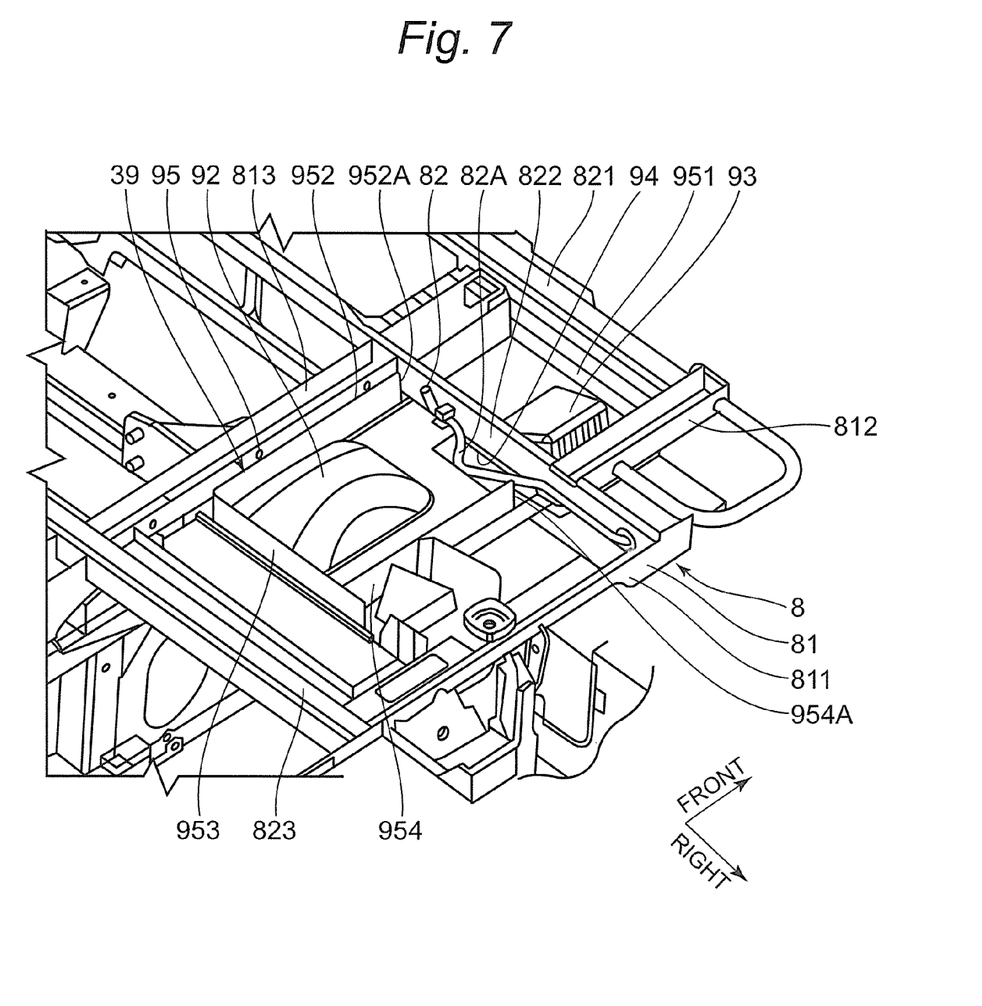
FIG. 7 is a perspective view viewed from upper right, of a bottom of a cargo bed and a top cover of the storage box of the utility vehicle in a case where the cargo bed is located at a normal position.
Figure 8:
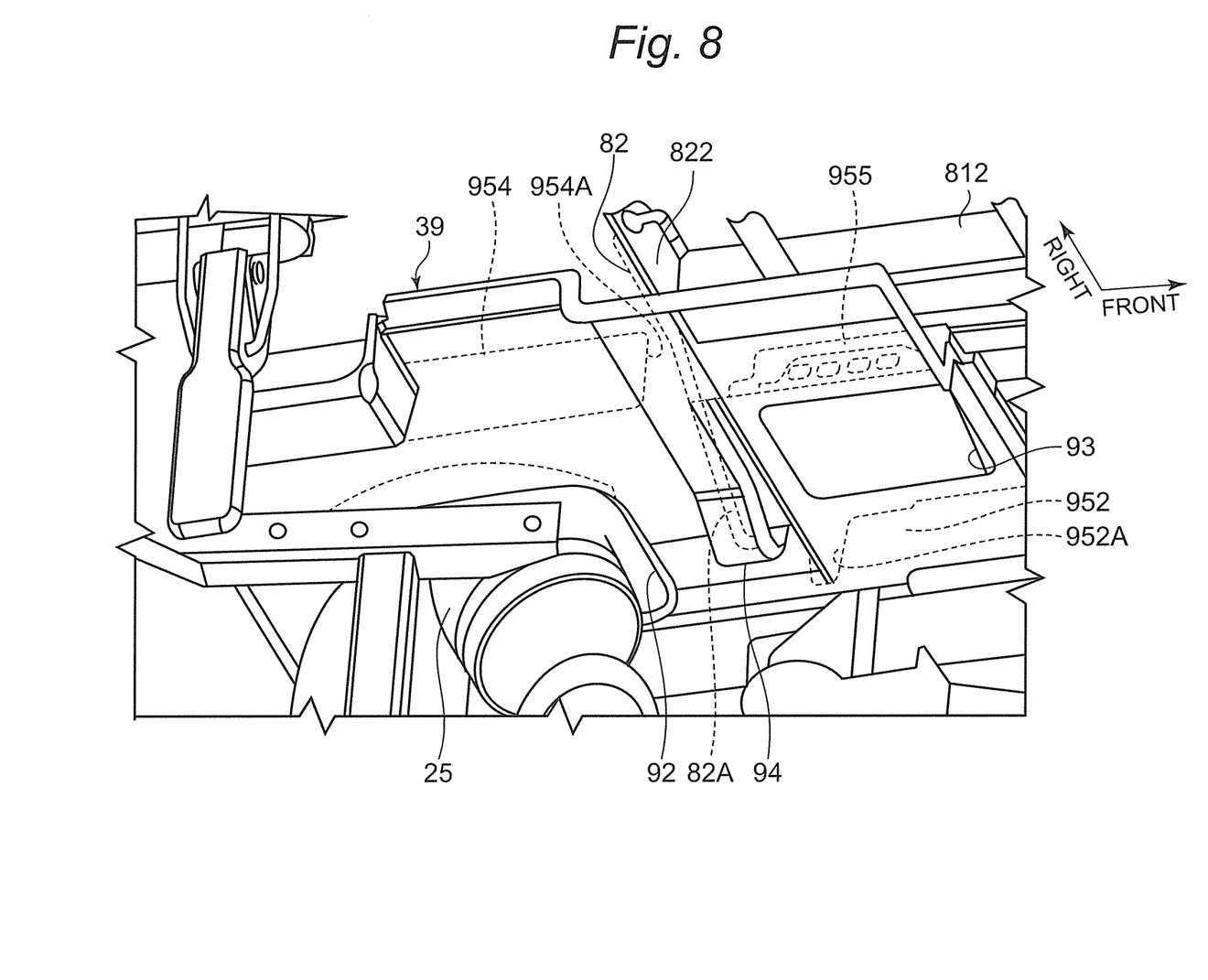
FIG. 8 is a perspective view viewed from lower right, of the top cover shown in FIG. 7.

FIG. 7 is a perspective view viewed from upper right, of a bottom 81 of the cargo bed 8 and the top cover 39 in a case where the cargo bed 8 is located horizontally at a normal position. FIG. 8 is a perspective view viewed from lower right, of the top cover 39 shown in FIG. 7.

As shown in FIGS. 7 and 8, the bottom 81 of the cargo bed 8 has longitudinal frames 811, 812, and 813 extending in parallel with one another in the front-back direction, and lateral frames 821, 822, and 823 extending in parallel with one another in the vehicle width direction.

The first convex portion 92, the recess portion 94, the left wall 952, the rear wall 953, and the right wall 954 of the top cover 39 are located in a region surrounded with the longitudinal frames 811 and 813 and the lateral frames 822 and 823.

The second convex portion 93, the front wall 951, the left wall 952, and the right wall 955 of the top cover 39 are located in a region surrounded with the longitudinal frames 812 and 813 and the lateral frames 821 and 822.

The lateral frame 822 extends in the vehicle width direction between the right wall 954 and the right wall 955, through the cutout 952A in the left wall 952 of the top cover 39. The wall portion 95 thus does not interfere with the lateral frame 822. A support rod 82 is attached in the vehicle width direction, to the lateral frame 822.

The support rod 82 retains the cargo bed 8 at a dump position when the cargo bed 8 is lifted upward to the dump position. The support rod 82 is a metal round bar. The support rod 82 has a bent portion 82A. The recess portion 94 of the top cover 39 forms a groove curved along the bent portion 82A of the support rod 82. The recess portion 94 inhibits interference between the bent portion 82A of the support rod 82 and the top cover 39. When the cargo bed 8 is located at the normal position, the support rod 82 extends substantially perpendicularly to the right walls 954 and 955 of the top cover 39 and is located at the cutout 954A between the right wall 954 and the right wall 955. The cutout 954A inhibits interference between the support rod 82 and the top cover 39.

The first convex portion 92 of the top cover 39 is curved to form a convex shape along the cooling duct 25 of the V-belt continuously variable transmission. The first convex portion 92 thus does not interfere with the cooling duct 25.

Effects of the Embodiment (1) The storage box 30 has the top cover 39 covering part of the opening 300. Design flexibility can be thus enhanced with no restriction by the position or the shape of the bottom plate of the cargo bed 8. This decreases the clearance between the part of the opening 300 and the top cover 39. As compared to a case where the opening 300 is covered with the bottom plate of the cargo bed 8, the clearance between the opening 300 and the top cover 39 can be decreased and the sealing member used for filling the clearance is decreased in amount. This leads to reduction in material cost and stabilization of the sealing property.

(2) The top cover 39 is provided with the intake port 90. Air is thus supplied into the storage box 30 through the intake port 90. As compared to a case where air is supplied into the storage box 30 from the bottom of the storage box 30, water, dust, and the like blown upward from the ground surface or the like are prevented from entering the storage box 30.

(3) The intake port 90 is opened outward in the vehicle width direction. Air is thus imported from outside in the vehicle width direction to the storage box 30 through the intake port 90. Water, dust, and the like blown upward from the ground surface or the like are likely to accumulate inside rather than outside in the vehicle width direction of the storage box 30. Dust and the like from the engine 11 are likely to accumulate around the engine located inside in the vehicle width direction of the storage box 30. As compared to a case where air is imported from inside in the vehicle width direction of the storage box 30, water, dust, and the like are more reliably prevented from entering the storage box 30.

(4) The intake port 90 is provided with the filter member 902. Air is thus imported to the storage box 30 through the filter member 902 of the intake port 90. As compared to a case where air is imported directly from the intake port 90, water, dust, and the like are more reliably prevented from entering the storage box 30.

(5) The wall portion 95 projects upward from the flat portion 91 of the top cover 39 so as to surround the intake port 90. The wall portion 95 prevents water, dust, and the like from entering a region on the flat portion 91 of the top cover 39, so as to further decrease water, dust, and the like entering the storage box 30 from the region on the flat portion 91 of the top cover 39 through the intake port 90.

(6) The intake port 90 is opened toward the wall portion 95. The wall portion 95 prevents water, dust, and the like from directly entering the intake port 90, so as to more effectively decrease water, dust, and the like entering the storage box 30 through the intake port 90.

Other Embodiments (1) The top cover 39 is provided with the intake port 90 in the embodiment described above. The present invention is, however, not limited to this configuration. The present invention has only to include a structure configured to prevent water, dust, and the like from entering the storage box 30 as well as import air. For example, the storage box 30 can be alternatively provided with an air intake duct that allows the inside and the outside of the storage box 30 to communicate with each other.

(2) The intake port 90 is opened outward in the vehicle width direction in the above embodiment. The present invention is not limited this case. The intake port 90 can be alternatively opened inward in the vehicle width direction, forward, upward, or the like.

(3) The intake port 90 is provided with the filter member 902 in the above embodiment. The present invention is, however, not limited to this configuration. The filter member may not be provided.

(4) The top cover 39 is provided with the wall portion 95 surrounding the intake port 90 in the above embodiment. The present invention is, however, not limited to this configuration. For example, the wall portion can be simply provided to face the intake port, or the wall portion may not be provided.

(5) The storage box 30 is located below the cargo bed 8 in the above embodiment. The present invention is, however, not limited to this configuration. For example, the storage box can be located below the seat.

(6) The opening 300 extends partially over the top surface, the front surface, and the outer side surface (right side surface) in the vehicle width direction of the storage box 30 in the above embodiment. The present invention is, however, not limited to this configuration. For example, the opening can be provided only at part of the top surface of the storage box.

(7) The top cover 39 covers part of the opening 300 of the storage box 30 in the above embodiment. The present invention is, however, not limited to this configuration. For example, the top cover can entirely cover the opening provided in the top surface of the storage box.

(8) The storage box 30 collectively accommodates the air inlet 16A of the air import duct 16 of the air cleaner 21 and the air inlet 25A of the cooling duct 25 of the V-belt continuously variable transmission 12 in the above embodiment. The present invention is, however, not limited to this configuration. For example, the storage box can accommodate only one of the air inlet of the air import duct of the air cleaner and the air inlet of the cooling duct of the V-belt continuously variable transmission, or can accommodate none of them.

(9) The seat 6 according to the above embodiment configures the single seat row. The utility vehicle can alternatively have two seat rows, or three or more seat rows.

(10) The present invention is not limited to the configurations according to the embodiment described above, but can include various modification examples devisable within the range not departing from the features recited in the following patent claims.

What is claimed is:

1. A utility vehicle comprising:
   a chassis;
   at least one seat row provided on the chassis;
   a cargo bed provided behind the at least one seat row;
   an engine provided on the chassis; and
   a storage box provided below the at least one seat row or the cargo bed, the storage box being configured to store engine equipment,
   wherein the storage box has a box body for storing the engine equipment and an opening in a top surface facing the at least one seat row or the cargo bed, and a top cover covering the opening, and
   wherein air is supplied into the storage box through a space formed by the cargo bed and the top cover.

2. The utility vehicle according to claim 1, wherein:
   the top cover has an intake port, located at a top of the storage box, for supplying the storage box with air;
   the top cover has a wall portion projecting upward from a top surface of the top cover to surround the intake port; and
   the wall portion is provided with a cutout at a portion which is not opposed to the intake port.

3. The utility vehicle according to claim 2, wherein the intake port is opened outward in a vehicle width direction.

4. The utility vehicle according to claim 2, wherein the intake port is provided with a filter member.

5. The utility vehicle according to claim 2, wherein the intake port is opened toward the wall portion.

6. The utility vehicle according to claim 1, wherein the storage box accommodates at least an air cleaner and an engine air intake duct.

* * * * *